United States Patent Office 2,850,544
Patented Sept. 2, 1958

2,850,544
PREPARATION OF HYDRINDACENES

Louis Schmerling, Riverside, Ill., assignor to Universal Oil Products Company, Des Plaines, Ill., a corporation of Delaware No Drawing. Application August 5, 1955
Serial No. 526,778

17 Claims. (Cl. 260—668)

This invention relates to a method for preparing novel compositions of matter and more particularly to a process for the preparation of substituted hydrindacenes.

It is an object of this invention to provide a method for the preparation of novel compositions of matter comprising substituted hydrindacenes.

A further object of this invention is to provide a method for the preparation of novel compositions of matter comprising substituted hydrindacenes, said process being carried out in the presence of a protonic acid catalyst.

One embodiment of the invention resides in the process for the preparation of substituted hydrindacenes which comprises treating an aromatic hydrocarbon with a compound having the formula:

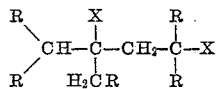

in which R is independently selected from the group consisting of alkyl or hydrogen radicals and X is a halogen radical in the presence of a protonic acid catalyst and recovering the resultant hydrindacene.

A further embodiment of the invention is found in a process for the preparation of substituted hydrindacenes by treating an aromatic hydrocarbon with an isoprene dihydrohalide in the presence of a protonic acid catalyst at a temperature in the range of from about 0° to about +35° C. and recovering the resultant hydrindacene.

A specific embodiment of the invention resides in a process for preparing 1,1,5,5-tetramethylhydrindacene by treating benzene with 1,3-dichloro-3-methylbutane in the presence of a catalyst comprising concentrated sulfuric acid at a temperature in the range of from about 0° to about +35° C. and recovering the resultant 1,1,5,5-tetramethylhydrindacene.

A more specific embodiment of the invention will be found in a process for the preparation of 1,1,5,5-tetramethylhydrindacene by treating benzene with 1,3-dichloro-3-methylbutane in the presence of a solvent comprising methylcyclohexane and a catalyst comprising concentrated sulfuric acid at a temperature in the range of from about 0° to about +35° C. and recovering the resultant 1,1,5,5-tetramethylhydrindacene.

Yet another specific embodiment of the invention is found in a new composition of matter comprising 1,1,5,5-tetramethylhydrindacene.

Other objects and embodiments referring to alternative aromatic hydrocarbons and alternative compounds having the formula:

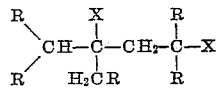

in which R and X are substituents hereinbefore described will be found in the following further detailed description of the invention.

It has now been discovered that substituted hydrindacenes may be prepared by treating an aromatic hydrocarbon with a compound having the following formula:

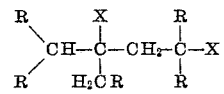

in which R may consist of an alkyl or a hydrogen radical and X comprises a halogen radical, in the presence of a protonic acid alkylating catalyst. The preferred halogens in the aforementioned formula comprise chlorine and bromine; iodine and fluorine may be used, although not necessarily with equivalent results. The products thus prepared are useful as intermediates for the preparation of other organic compounds such as pharmaceuticals, oxidation inhibitors, detergents, etc. For example, benzene may be treated with isoprene dihydrochloride in the presence of a protonic acid catalyst to form 1,1,5,5-tetramethylhydrindacene. This compound may then be converted to 4-hydroxy-1,1,5,5-tetramethylhydrindacene and 4,8-dihydroxy-1,1,5,5-tetramethylhydrindacene by hydrolysis of the sulfonic acid formed by its sulfonation or by reaction of the diazonium compound formed from the amines obtained by reduction of the nitro derivatives formed by its nitration. These hydroxy compounds show marked activity as oxidation inhibitors.

Aromatic hydrocarbons which may be used in this process include benzene, toluene, ethylbenzene, propylbenzene, p-xylene, p-diethylbenzene, p-dipropylbenzene, naphthalene, α-methylnaphthalene, β-methylnaphthalene, α-ethylnaphthalene, β-ethylnaphthalene, etc. Compounds of the formula:

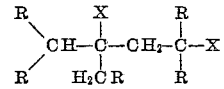

in which R and X are substituents of the classes hereinbefore described which are used to treat the aromatic hydrocarbon include 1,3-dichloro-3-methylbutane (isoprene dihydrochloride), 1,3-dibromo-3-methylbutane (isoprene dihydrobromide), 1,3-dichloro-3-ethylbutane, 2,4-dichloro - 2,4 - dimethylpentane, 1,3-dibromo-3-ethylpentane, 1,3-dichloro-3-methylpentane, etc.

The process of the invention is carried on in the presence of a protonic acid alkylation catalyst. Examples of protonic acids include sulfuric acid, hydrogen fluoride, phosphoric acid, silica-alumina composites, etc. In addition, if so desired, the reaction may be carried out in the presence of a saturated hydrocarbon. These saturated hydrocarbons include paraffins and cycloparaffins containing a tertiary carbon atom, as well as compounds which may be isomerized to such tertiary carbon atom containing hydrocarbons under the conditions of the reaction. Examples of these hydrocarbons include n-pentane, isopentane, n-hexane, isohexane, etc., cyclohexane, methylcyclopentane, ethylcyclopentane, propylcyclopentane, methylcyclohexane, ethylcyclohexane, 1,2-dimethylcyclopentane, 1,2-diethylcyclopentane, 1,2-dimethylcyclohexane, 1,2-diethylcyclohexane, 1,4-dimethylcyclohexane, 1,4-diethylcyclohexane, etc. In addition, the process of this invention is carried out at relatively low temperatures, said temperatures being in the range of from about 0° to about +35° C. with sulfuric acid or hydrogen fluoride and from about 25° to 200° C. with phosphoric acid as catalyst.

The process of this invention may be effected in any suitable manner and may comprise either a batch or continuous type operation. When a batch type operation is used, a quantity of the starting materials, namely the aromatic hydrocarbon and the halo compound of the general formula:

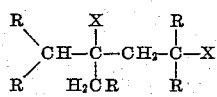

are added to a stirred mixture of the aromatic hydrocarbon, the saturated hydrocarbon, if so desired, and the catalyst in a suitable alkylating vessel. The vessel is maintained at the desired low temperature until the addition of the reactants is completed, after which the temperature is allowed to rise to the upper limits hereinbefore stated, meanwhile continuously agitating the reaction mixture. After a predetermined residence time has elapsed, the reaction is separated from the unreacted starting materials by conventional means, for example, by washing, drying and fractional distillation. Purification of the reaction product may then be effected by recrystallization from organic solvents such as alcohol, ethers, etc.

Another method of operation of the present process is of the continuous type. In this process the starting materials are continuously introduced into a reaction zone which is maintained at the proper operating conditions of temperature and pressure. These starting materials can be continuously introduced into the vessel by separate means or may be previously admixed outside the vessel and the resulting mixture introduced in the vessel in a single stream. The catalyst comprising a protonic acid is also introduced into said reactor through separate means. At the end of the desired residence time the reaction products will be continuously withdrawn from the reaction zone and separated from the unreacted aromatic hydrocarbon and alkylating agent, the latter two being recycled for use as a portion of the starting materials while the substituted hydrindacenes are withdrawn and purified by the conventional means hereinbefore set forth. The reaction zone in which the reaction takes place may comprise an unlined vessel or coil, or it may contain an adsorbent material such as fire brick, alumina, dehydrated bauxite and the like.

Examples of compounds which may be prepared according to this reaction, include 1,1,5,5-tetramethylhydrindacene, 1,1,5,5-tetraethylhydrindacene, 1,1,5,5-tetrapropylhydrindacene, 1,1,4,5,5-pentamethylhydrindacene, 1,1,5,5-tetramethyl-4-ethylhydrindacene, 1,1,4,5,5,8-hexamethylhydrindacene, 1,1,5,5-tetramethyl-4,8-diethylhydrindacene, 1,1,3,3,5,5,7,7-octamethylhydrindacene, etc.

The following examples are given to illustrate the process of the present invention which, however, are not intended to limit the generally broad scope of the present invention in strict accordance therewith.

*Example I*

A solution of 35 g. (0.25 mole) of 1,3-dichloro-3-methylbutane (isoprene dihydrochloride) in 20 g. of benzene was gradually added to a stirred mixture of a solution of 75 g. of methylcyclohexane in 80 g. of benzene and 100 g. of 96% sulfuric acid in an alkylating flask. The temperature of the flask was maintained at a temperature of from 1° to about 3° C. during the addition of the dihalide in the benzene, said addition taking approximately 3 hours. The mixture was subsequent stirred for approximately 2.5 hours, the temperature being allowed to rise to a range of from about 22° to about 28° C. At the end of this time the upper layer was separated from the lower catalyst layer, washed with water, dried and subjected to fractional distillation under reduced pressure. A cut boiling principally at 113–116° C. at 4 mm. pressure was separated out, the material of the cut crystallizing upon standing. The product was recrystallized from dilute ethyl alcohol and yielded nacreous flakes which melted at 94° C. An analysis of these crystals gave the following figures: Calculated for $C_{16}H_{22}$ (1,1,5,5-tetramethylhydrindacene): C, 89.65; H, 10.35. Found: C, 89.68; H, 10.30. As by-products of the reaction there were obtained smaller amounts of 1,1-dimethylindan boiling at 48–50° C. at 4 mm. pressure and of 1-chloro-2-methylphenylbutane boiling at 85–90° C. at 4 mm. pressure.

*Example II*

A solution containing 0.25 mole of 1,3-dichloro-3-methylbutane in 1.3 mole of benzene was slowly added during a period of approximately 3 hours to a solution comprising 0.75 mole of methylcyclopentane in 80 g. of benzene and 100 g. of 96% sulfuric acid at a temperature of from about 29° to about 32° C. The resulting mixture was continuously stirred for an additional 2.5 hours after which the upper layer was separated from the lower catalyst layer, washed with water, dried and subjected to fractional distillation under reduced pressure. A cut boiling in the range of from about 127° C. at 9 mm. pressure was separated out and crystallized upon standing. The product was recrystallized from dilute ethyl alcohol yielding a product which melted at 90–92° C. This product comprised 1,1,5,5-tetramethylhydrindacene.

*Example III*

A solution containing 0.25 mole of 1,3-dichloro-3-methylbutane and 1.3 mole of benzene was slowly added during a period of approximately 3 hours to a solution consisting of 0.77 mole of methylcyclohexane in 80 g. of benzene and 64 g. of hydrogen fluoride at a temperature of about 0° C. The resulting mixture was continuously stirred for an additional 2.5 hours, after which the flask and contents thereof were allowed to come to room temperature. The upper layer was separated from the lower catalyst layer and subjected to the treatment described above in Examples I and II, 1,1,5,5-tetramethylhydrindacene being recovered therefrom.

I claim as my invention:

1. A process for the preparation of a substituted hydrindacene which comprises treating an aromatic hydrocarbon free of olefinic unsaturation with a compound having the formula:

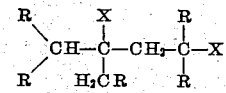

in which R is independently selected from the group consisting of alkyl and hydrogen radicals and X is a halogen radical in the presence of a protonic acid catalyst selected from the group consisting of sulfuric acid, hydrogen fluoride, phosphoric acid and silica-alumina, and recovering the resultant hydrindacene.

2. A process for the preparation of a substituted hydrindacene which comprises treating an aromatic hydrocarbon free of olefinic unsaturation with a compound having the formula:

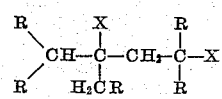

in which R is independently selected from the group consisting of alkyl and hydrogen radicals and X is a halogen radical in the presence of a sulfuric acid catalyst, and recovering the resultant substituted hydrindacene.

3. A process for the preparation of a substituted hydrindacene which comprises treating an aromatic hydrocarbon free of olefinic unsaturation with a compound having the formula:

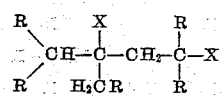

in which R is independently selected from the group consisting of alkyl and hydrogen radicals and X is a halogen radical in the presence of hydrogen fluoride catalyst, and recovering the resultant substituted hydrindacene.

4. A process for the preparation of a substituted hydrindacene which comprises treating an aromatic hydrocarbon free of olefinic unsaturation with an isoprene dihalide in the presence of a protonic acid catalyst selected from the group consisting of sulfuric acid, hydrogen fluoride, phosphoric acid and silica-alumina at a temperature in the range of from about 0° C. to about 200° C., and recovering the resultant substituted hydrindacene.

5. A process for the preparation of a substituted hydrindacene which comprises treating an aromatic hydrocarbon free of olefinic unsaturation with isoprene dihydrochloride in the presence of a catalyst comprising concentrated sulfuric acid at a temperature in the range of from about 0° to about +35° C., and recovering the resultant substituted hydrindacene.

6. A process for the preparation of a substituted hydrindacene which comprises treating an aromatic hydrocarbon free of olefinic unsaturation with isoprene dihydrobromide in the presence of a catalyst comprising concentrated sulfuric acid at a temperature in the range of from about 0° to about +35° C., and recovering the resultant substituted hydrindacene.

7. A process for the preparation of 1,1,5,5-tetramethylhydrindacene which comprises treating benzene with isoprene dihydrochloride in the presence of a catalyst comprising concentrated sulfuric acid at a temperature in the range of from about 0° to about +35° C., and recovering the resultant 1,1,5,5-tetramethylhydrindacene.

8. A process for the preparation of 1,1,4,5,5-pentamethylhydrindacene which comprises treating toluene with isoprene dihydrochloride in the presence of a catalyst comprising concentrated sulfuric acid at a temperature of about 0° to about +35° C., and recovering the resultant 1,1,4,5,5-pentamethylhydrindacene.

9. A process for the preparation of 1,1,4,5,5,8-hexamethylhydrindacent which comprises treating p-xylene with isoprene dihydrochloride in the presence of a catalyst comprising concentrated sulfuric acid at a temperature in the range of from about 0° to about +35° C., and recovering the resultant 1,1,4,5,5,8-hexamethylhydrindacene.

10. A process for the preparation of 1,1,5,5-tetraethylhydrindacene which comprises treating benzene with 1,3-dichloro-3-ethylpentane in the presence of a catalyst comprising concentrated sulfuric acid at a temperature in the range of from about 0° to about +35° C., and recovering the resultant 1,1,5,5-tetraethylhydrindacene.

11. A process for the preparation of a substituted hydrindacene which comprises treating an aromatic hydrocarbon free of olefinic unsaturation with a compound having the formula:

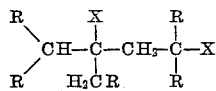

in which R is independently selected from the group consisting of alkyl and hydrogen radicals and X is a halogen radical in the presence of a saturated hydrocarbon solvent and a protonic acid catalyst selected from the group consisting of sulfuric acid, hydrogen fluoride, phosphoric acid and silica-alumina, and recovering the resultant substituted hydrindacene.

12. A process for the preparation of a substituted hydrindacene which comprises treating an aromatic hydrocarbon free of olefinic unsaturation with a compound having the formula:

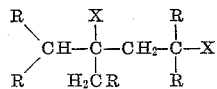

in which R is independently selected from the group consisting of alkyl and hydrogen radicals and X is a halogen radical in the presence of a solvent comprising a paraffin and a sulfuric acid catalyst, and recovering the resultant substituted hydrindacene.

13. A process for the preparation of a substituted hydrindacene which comprises treating an aromatic hydrocarbon free of olefinic unsaturation with a compound having the formula:

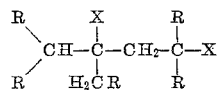

in which R is independently selected from the group consisting of alkyl and hydrogen radicals and X is a halogen radical in the presence of a solvent comprising a cycloparaffin and a sulfuric acid catalyst at a temperature in the range of from about 0° to about +35° C., and recovering the resultant substituted hydrindacene.

14. A process for the preparation of a substituted hydrindacene which comprises treating an aromatic hydrocarbon free of olefinic unsaturation with a compound having the formula:

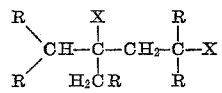

in which R is independently selected from the group consisting of alkyl and hydrogen radicals and X is a halogen radical in the presence of a solvent comprising a methylcyclohexane and a catalyst comprising concentrated sulfuric acid and recovering the resultant substituted hydrindacene.

15. A process for the preparation of 1,1,5,5-tetramethylhydrindacene which comprises treating benzene with isoprene dihydrochloride in the presence of a solvent comprising methylcyclohexane and a catalyst comprising concentrated sulfuric acid at a temperature in the range of from about 0° C. to about +35° C., and recovering the resultant 1,1,4,4-tetramethylhydrindacene.

16. A process for the preparation of 1,1,5,5-tetramethylhydrindacene which comprises treating benzene with isoprene dihydrochloride in the presence of a solvent comprising methylcyclopentane and a catalyst comprising concentrated sulfuric acid at a temperature in the range of from about 0° C. to about +35° C., and recovering the resultant 1,1,4,4-tetramethylhydrindacene.

17. A process for the preparation of 1,1,3,3,5,5,7,7-octamethylhydrindacene which comprises treating benzene with 2,4-dichloro-2,4-dimethylpentane in the presence of a solvent comprising methylcyclopentane and a catalyst comprising concentrated sulfuric acid at a temperature in the range of from about 0° C. to about +35° C., and recovering the resultant 1,1,3,3,5,5,7,7-octamethylhydrindacene.

References Cited in the file of this patent

UNITED STATES PATENTS 2,768,982    Schlatter _____ Oct. 30, 1956

OTHER REFERENCES

Labunskii et al.: Chemical Abstracts, 1952, page 50226 (abstracted from Doklady Akad. Nauk S. S. S. R., vol. 80 (1951), pages 369–372).